United States Patent

[11] 3,588,461

[72] Inventor James Richard Halsall
Reading, England
[21] Appl. No. 787,722
[22] Filed Dec. 30, 1968
[45] Patented June 28, 1971

[73] Assignee Imperial Chemical Industries Limited
London, England

[32] Priority Jan. 10, 1968
[33] Great Britain
[31] 1439/68

[54] COUNTER FOR ELECTRICAL PULSES

7 Claims, 6 Drawing Figs.

[52] U.S. Cl. ........ 235/92GD, 235/155, 340/347DD
[51] Int. Cl. ........ H03k 13/256, G06f 5/02
[50] Field of Search ........ 340/347, D/D; 235/92, 154, 155

[56] References Cited

UNITED STATES PATENTS

| | | | |
|---|---|---|---|
| 2,983,913 | 5/1961 | Zdanowich | 340/347 |
| 3,017,093 | 1/1962 | Rowley | 235/155 |
| 3,138,794 | 6/1964 | Blum | 340/347 |
| 3,210,756 | 10/1965 | Flood | 340/347 |
| 3,311,737 | 3/1967 | Soltz et al. | 235/92 |
| 3,349,332 | 10/1967 | Bleickardt | 235/92X |
| 3,393,298 | 7/1968 | Olson | 235/92 |
| 3,426,296 | 2/1969 | Christiansen et al. | 235/92X |

*Primary Examiner*—Daryl W. Cook
*Assistant Examiner*—Michael K. Wolensky
*Attorney*—Cushman, Darby and Cushman

ABSTRACT: This invention relates to a counter for counting electric pulses for use in digital computers and instrumentation systems. The pulse counter of the invention comprises a plurality of bistable elements arranged to produce an output in Gray code and suitably connected to a plurality of Exclusive-OR elements for converting the Gray code output to a binary code output, means for generating a parity signal from the binary code output and means for applying the parity signal to the plurality of bistable elements. The pulse counter of the invention may be constructed so that there is no overflow in either direction or may alternatively be constructed to permit overflow and, consequently, continuous counting.

INVENTOR
JAMES RICHARD HALSALL

BY
Cushman, Darby & Cushman
ATTORNEYS

INVENTOR
JAMES RICHARD HALSALL

By
Cushman, Darby & Cushman
ATTORNEYS

INVENTOR
JAMES RICHARD HALSALL

BY Cushman, Darby & Cushman
ATTORNEYS

INVENTORS
JAMES RICHARD HALSALL
By Cushman, Darby & Cushman
ATTORNEYS

COUNTER FOR ELECTRICAL PULSES

This invention relates to a counter for counting electrical pulses for use, for example, in digital computers and instrumentation systems. The counter of the invention is particularly useful in on-line computer control and digital instrumentation systems requiring a plurality of external counters to be interrogated by the computer on demand and without the computer having to ensure that the counters were free from transition errors.

According to this invention an electric pulse counter comprises a plurality of bistable elements arranged to produce an output in Gray code and suitably connected to a plurality of Exclusive—OR logic elements for converting the Gray code output to a binary code output, means for generating a parity signal (as hereinafter defined) from the binary code output to represent the parity of the Gray code output and means for applying the parity signal to the plurality of bistable elements. Preferably the counter includes direction control means operable by a control signal for reversing the parity signal and thereby reversing the direction of counting by the counter. Conveniently, the bistable elements are in the form of flip-flops connected in cascade.

The problem of transition errors referred to earlier is avoided in a counter according to the invention by the use of the Gray code in which, during the transition from any number to the next, only one bistable element changes its state in the plurality of bistable elements.

The means for reversing the parity signal may comprise a nonequivalence or a further Exclusive—OR logic element. The nonequivalence of the Exclusive—OR logic elements may comprise an assembly of NOT—AND or NAND gates. The flip-flops may be of the master-slave type for delaying the change in output state of the element until the initiating input pulse has terminated. Thus any input pulse is prevented from causing more than one change of state of the counter output.

According to one feature of the present invention, the counter may be constructed so that there is no overflow in either direction if additive pulses beyond the maximum capacity are received or if subtractive pulses below zero are received. This overflow is prevented by the parity control of the gating circuits.

According to another feature of this invention the counter may be constructed to permit overflow and, consequently, continuous counting. This feature may be achieved by including an additional bistable element or flip-flop operable to transmit a signal which causes the counter to reverse operation. Thus, the counter may be arranged to add input pulses until the full state is reached then to subtract input pulses until the empty state is reached continuously. Further, if desired, the rate of filling and/or emptying may be the same or different under the control of external equipment.

The structures of the Gray code and the conventional binary code corresponding to the decimal numbers from 0 to 16 are shown in Table I below, where columns $a_1$ and $a_2$ represent the least significant digits in binary and Gray code respectively:

TABLE I

| Decimal Number | Binary code | | | | | Gray code | | | | | |
|---|---|---|---|---|---|---|---|---|---|---|---|
| | $e_1$ | $d_1$ | $c_1$ | $b_1$ | $a_1$ | $e_2$ | $d_2$ | $c_2$ | $b_2$ | $a_2$ | Gray parity |
| 0 | 0 | 0 | 0 | 0 | 0 | 0 | 0 | 0 | 0 | 0 | Even. |
| 1 | 0 | 0 | 0 | 0 | 1 | 0 | 0 | 0 | 0 | 1 | Odd. |
| 2 | 0 | 0 | 0 | 1 | 0 | 0 | 0 | 0 | 1 | 1 | Even. |
| 3 | 0 | 0 | 0 | 1 | 1 | 0 | 0 | 0 | 1 | 0 | Odd. |
| 4 | 0 | 0 | 1 | 0 | 0 | 0 | 0 | 1 | 1 | 0 | Even. |
| 5 | 0 | 0 | 1 | 0 | 1 | 0 | 0 | 1 | 1 | 1 | Odd. |
| 6 | 0 | 0 | 1 | 1 | 0 | 0 | 0 | 1 | 0 | 1 | Even. |
| 7 | 0 | 0 | 1 | 1 | 1 | 0 | 0 | 1 | 0 | 0 | Odd. |
| 8 | 0 | 1 | 0 | 0 | 0 | 0 | 1 | 1 | 0 | 0 | Even. |
| 9 | 0 | 1 | 0 | 0 | 1 | 0 | 1 | 1 | 0 | 1 | Odd. |
| 10 | 0 | 1 | 0 | 1 | 0 | 0 | 1 | 1 | 1 | 1 | Even. |
| 11 | 0 | 1 | 0 | 1 | 1 | 0 | 1 | 1 | 1 | 0 | Odd. |
| 12 | 0 | 1 | 1 | 0 | 0 | 0 | 1 | 0 | 1 | 0 | Even. |
| 13 | 0 | 1 | 1 | 0 | 1 | 0 | 1 | 0 | 1 | 1 | Odd. |
| 14 | 0 | 1 | 1 | 1 | 0 | 0 | 1 | 0 | 0 | 1 | Even. |
| 15 | 0 | 1 | 1 | 1 | 1 | 0 | 1 | 0 | 0 | 0 | Odd. |
| 16 | 1 | 0 | 0 | 0 | 0 | 1 | 1 | 0 | 0 | 0 | Even. |

The parity of a number in the Grade code is defined as whether the number in Gray code contains an odd or an even number (including zero) of ones. Thus when the parity of a number in Gray code is even, the least significant digit of the equivalent binary number is zero, and when the parity of a number in Gray code is odd, the least significant digit of the equivalent binary number is one.

The parity of a number Gray code can, therefore, be determined by translating the Gray code number into a binary number, and examining the state of the least significant binary digit. Translation from Gray code to binary code can be performed by setting the most significant binary digit to equal the most significant Gray digit, and then forming the next binary digit by adding the next Gray digit to the most significant binary digit. The new binary digit so formed is then added to the next lower Gray to form the next lower binary digit using the ordinary rules for binary addition, but ignoring carries, as shown in the following example taken from the Table above for the decimal number 15:

| | $e_2$ | $d_2$ | $c_2$ | $b_2$ | $a_2$ | |
|---|---|---|---|---|---|---|
| Gray | 0 | 1 | 0 | 0 | 0 | Decimal 15 |
| | ↓ + | ↘ + | ↘ + | ↘ + | ↘ | |
| Binary | 0 | 1 | 1 | 1 | 1 | |
| | $e_1$ | $d_1$ | $c_1$ | $b_1$ | $a_1$ | |

In one circuit for the translation of a Gray code number into a binary number, nonequivalence or Exclusive—OR logical elements can be used to perform the necessary addition—without-carry operations.

An examination of the Gray code numbers in the Table above, reveals that for an increasing count an even parity condition always precedes a change in state of the least significant digit $a_2$. Conversely, for a decreasing count an odd parity condition always precedes a change in the digit $a_2$. Changes of state of all higher digits are preceded by an odd parity condition for increasing count and an even parity condition for decreasing count. Reversal of the parity signal therefore provides a means of reversing the direction of counting. The general condition for a change of state of the higher digits in Gray code is for the next lower digit to be in the 1 state and all the lesser digits to be in the 0 state.

This may be achieved using intermediate logic circuits inserted between successive flip-flop or bistable elements in order to establish a change of state.

The intermediate logic elements may comprise, for example, an assembly of NAND gates, or NOR gates. Other assemblies of logic elements may also be used providing the necessary switching conditions as referred to above are established.

A specific embodiment of the invention will now be described, by way of example, with reference to the accompanying drawings, in which.

Figure 1:
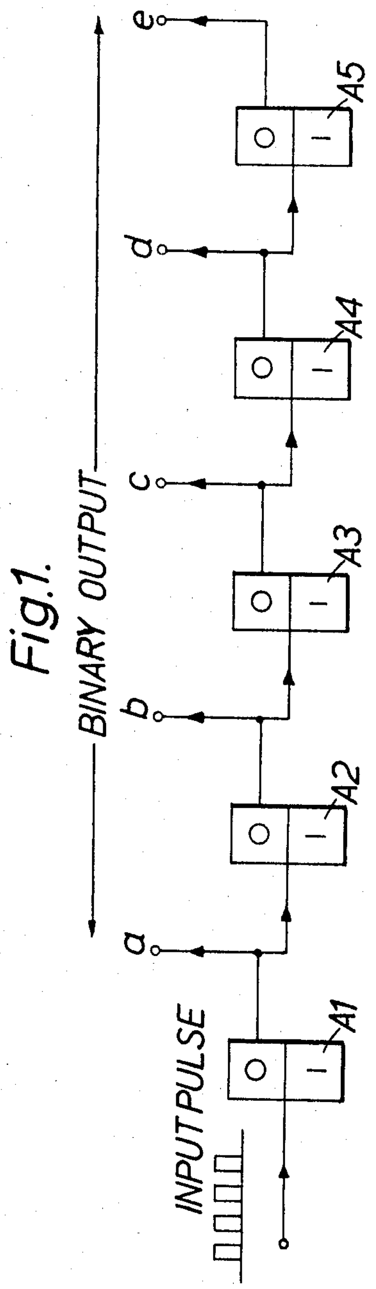
FIG. 1 illustrates a simple type of known counter for counting in binary code.

Referring to FIG. 1, there is illustrated a known ripple counter having a cascade of five bistable elements or flip-flops A1, to A5, with the binary output of the five elements available at the terminals *a* to *e* respectively, and the output of each element (except the last) driving the input of the following element. In the cascade the bistable element output *a* represents the least significant and $e$ the most significant digit. The states of the flip-flops represent the binary number equivalent of the total number of pulses fed into the counter. Each additional pulse entering the counter must change the states of as many of the flip-flops as is necessary to setup the new binary number equivalent. Thus, if 15 pulses are stored in the counter and a 16th pulse is received, the states of the counter must change from binary 01111 (decimal 15) to binary 10000 (decimal 16). In this example where five flip-flop elements must change state in sequence before the required stable state of the counter is reached, the counter will pass through certain binary states between 00000 and 10000 during the transition period. Serious errors would therefore arise if the counter were to be interrogated during such a transition period.

Figure 2:
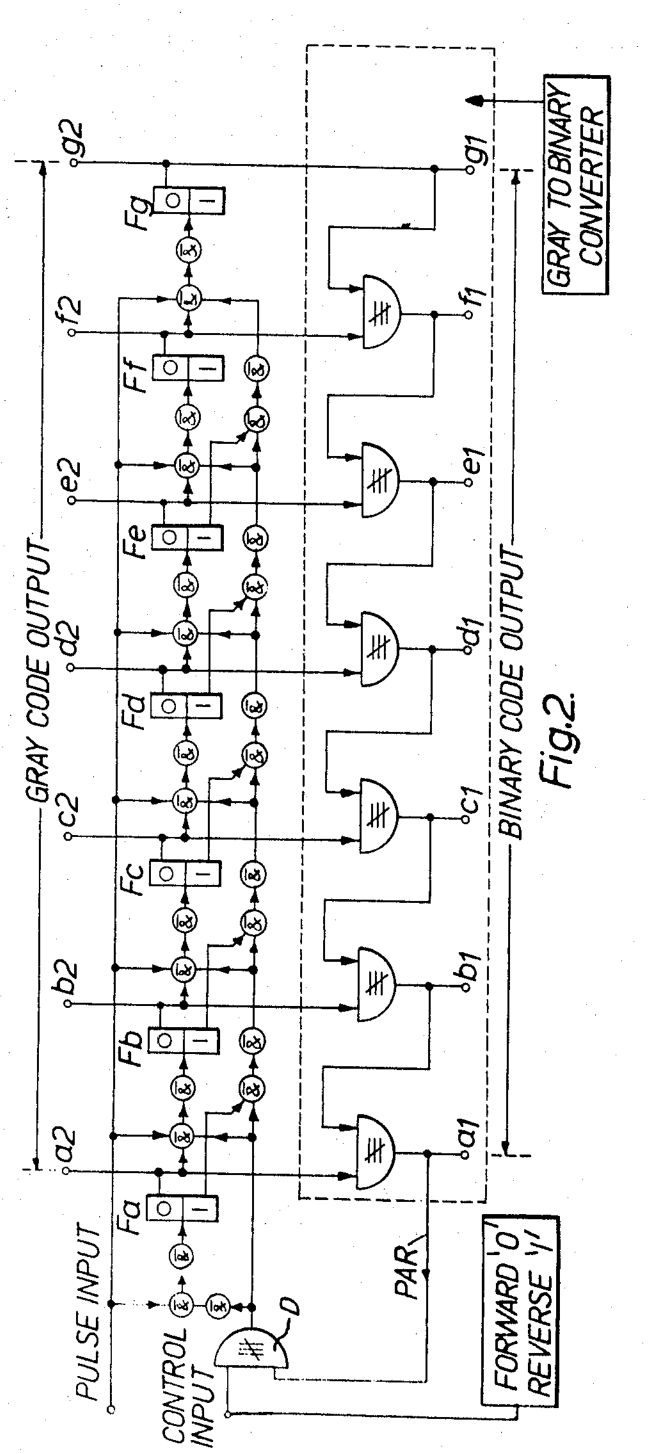
FIG. 2 illustrates the logical diagram of a seven-stage version of the counter according to the present invention.

In FIG. 2, seven bistable elements or flip-flops $F_a$ to $F_g$ are coupled through multiple NOT—AND or NAND gates $\overline{\&}$. Each NAND gate $\overline{\&}$ produces a logical output of 0 when all its inputs are 1, and a logical output of 1 under any other set of input conditions. Each bistable element $F_a$ to $F_g$ and its associated NAND gate $\overline{\&}$ forms a state of the counter and each stage, except the first and last, is identical so that the counter can be extended to afford any desired number of stages.

Figure 3:
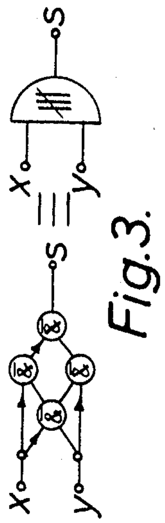
FIG. 3 illustrates one embodiment of an Exclusive—Or circuit using NAND gates suitable for use as a nonequivalence element in the Gray to binary code conversion arrangement schematically shown in FIG. 2.
Figure 4:
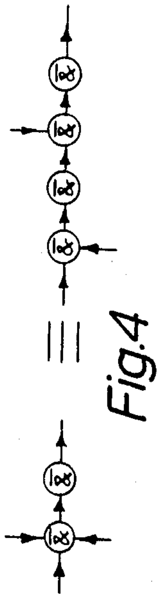
FIG. 4 illustrates a logic circuit which is alternative to the input circuit of flip-flops $F_b$ to $F_g$ show in FIG. 2.

The bistable elements $F_a$ to $F_g$ produce outputs at the respective terminals $a_2$ *to* $g_2$ in a progressive binary or Gray code. The output in Gray code is converted into a binary output at terminals $a_1$ *to* $g_1$ by means of respective nonequivalence or Exclusive—OR logical elements $\not\equiv$. The output $a_1$ is the least significant and the output $g_1$ is the most significant digit. Each nonequivalence element $\not\equiv$ has arrowed input terminals corresponding to $x$ and $y$ (FIG. 3) and an output terminal corresponding to $s$ (FIG. 3) connected to the appropriate binary output terminal $a_1$ to $g_1$ (see FIG. 3). FIG. 3 shows on the left-hand side thereof, an logic circuit built up from four NAND gates which may serve as a nonequivalence element. Two forms of logic circuit as shown in FIG. 4, may be assembled from a plurality of NAND gates $\overline{\&}$ to serve as input circuits of $F_b$ to $F_g$ of FIG. 2.

From the least significant digit of the binary code output, a parity signal for the Gary code output is obtained (as hereinbefore described) and is fed to one input terminal of a further nonequivalence element $\not\equiv$,D. The outputs of the terminals $a_1$ to $f_1$ constitute all the digits of the dual binary coded output except for the most significant, $g_1$. A logic control signal having the 1 or 0 state (in the 1 state the control signal complements the parity signal whereas in the 0 state the parity signal is uncomplemented or unaffected) is fed to the other input terminal of this further nonequivalence element $\not\equiv$,D, and the output of this further element $\not\equiv$,D, is fed to the flip-flop elements $F_a$ to $F_g$. The output of the further element $\not\equiv$,D, may be reversed by means of the control signal fed thereto, which controls the direction of counting by the counter.

The first stage, including the bistable element $F_a$, is controlled by the parity state and the pulse input only. Higher stages, including the bistable elements $F_b$ to $F_g$ respectively, are each controlled by the parity state, the pulse input, and the state of all the preceding stages.

Additive pulses beyond the maximum capacity of the counter or subtractive pulses below zero are inhibited by the parity control of the gating circuits to prevent overflow in either direction. The conditions for changing the state of a flip-flop have been described previously and, once the counter is full, no condition can exist whereby an additional pulse could possibly increase the count and vice versa. This feature is inherent in circuitry and the principle of control of the states of the flip-flops of the counter. The counter of the present invention can be modified to permit overflow and, when this facility is required, a further flip-flop is added.

The bistable elements $F_a$ to $F_g$ are of the master-slave or J.K. type which delay the change in their output state until the initiating input has terminated, thereby preventing ny input pulse from causing more than one change in state of the counter.

Figure 5:
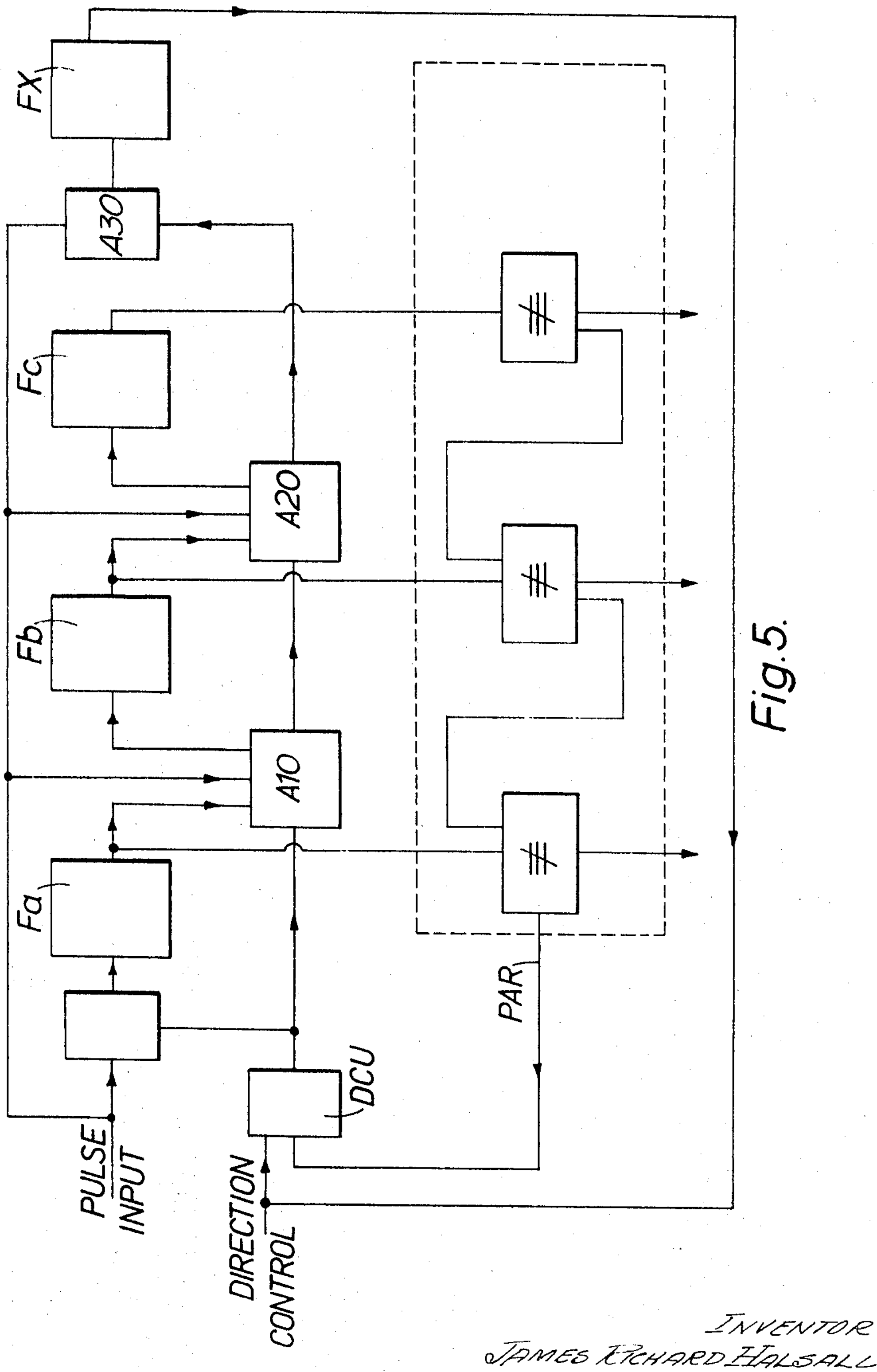
FIG. 5 is a block diagram of a counter made in accordance with this invention and having overflow provisions.

Fig. 5 shows a schematic wiring diagram of a counter in accordance with this invention and modified so as to permit overflow. In this FIG. three bistable elements or flip-flops, $F_a$, $F_b$ and $F_c$, intermediate logic elements represented by A1 and A2 and Gray/binary logic elements $\not\equiv$ similar to those used in FIG. 1 are indicated. To permit overflow, the circuit of FIG. 5 differs from that of FIG. 1 in that an additional intermediate logic circuit A3 and an additional bistable element FX are coupled in circuit as shown. The output of the bistable element FX and the parity line signal PAR are fed into a direction control unit DCU.

Figure 6:
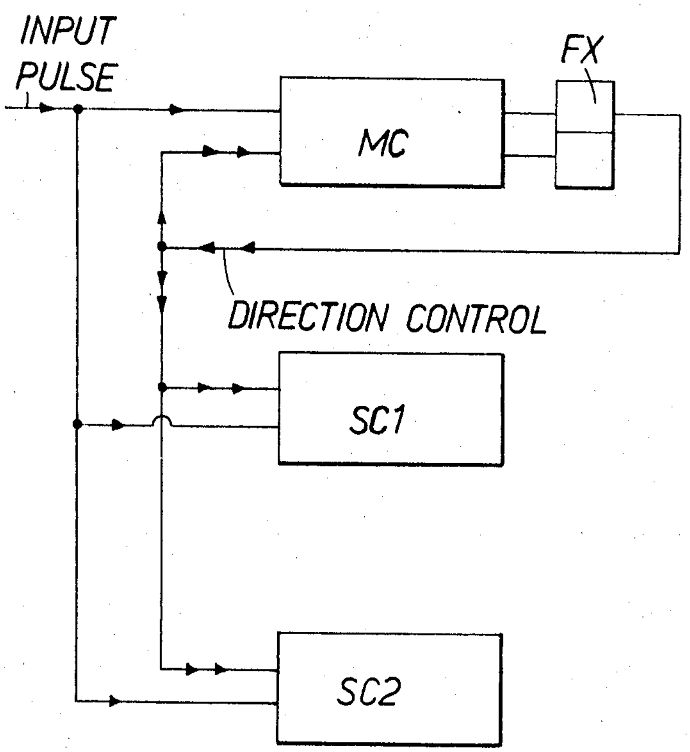
FIG. 6 is a block diagram of a plural counter system utilizing the individual counters of the invention.

FIG. 6 shows a schematic diagram of a master counter MC and two slave counters SC1 and SC2. The master counter MC includes an additional bistable intermediate logic arrangement FX discussed in connection with FIG. 5 whereas the slave counters are constructed in the same way as those shown in FIG. 2. The direction control signal from FX is fed to MC, SC1 and SC2 which are connected in parallel and which also receive pulses from the input pulse line.

Such a system will cause all the counters (MC, SC1 and SC2) to be in synchronism when the additional bistable element FX on the master counter MC has generated a second reversal or in other words the direction control signal has changed state.

A system as described in connection with FIG. 6 may be used in serial telemetering and may form the basis of a serialized scanning device for transmitting signals over a single line and extracting the signals as and when required.

The circuitry of the counters described in this specification may be constructed using microelectronic integrated circuit elements in the form of modules.

I claim:

1. A reversible electric pulse counter for counting pulses in Gray code up to a maximum capacity of $2^n$, the counter comprising:

a. $n$ stages of flip-flops of a type which delays a change in the output state thereof until the initiating input to the flip-flop has terminated;
b. a single input line for receiving pulses to be counted;
c. a multiple input enabling means associated with each flip-flop stage, each enabling means having a first one of its inputs connected to said input line;
d. output lines from said flip-flop stages for carrying as the counter output a Gray coded equivalent of the total number of pulses received on said input line;
e. $n-1$ logic circuits connected to said flip-flop output lines for generating as a single output from said circuits a parity signal which is a function of the Gray code output of said counter;
f. an additional logic circuit to which is supplied as inputs the parity signal and a direction control signal, said additional circuit having an output which is applied to a second one of the inputs of the multiple input enabling means associated with the first of said $n$ flip-flop stages to thereby control the change of state of said first flip-flop stage as a function of the input, parity and direction control signals; and
g. means for connecting additional ones of the inputs of the multiple input enabling means of the remaining flip-flop stages directly to output lines of the flip-flop stages next preceding and through further logic circuits to output lines of any remaining preceding flip-flop stages and to said additional logic circuit to thereby control said remaining flip-flop stages as a function of the states of the preceding stages of flip-flops as well as the input, parity and direction control signals.

2. A counter according to claim 1 wherein said $n-1$ logic circuits include individual output lines, said circuits being interconnected so as to generate on said $n-1$ logic circuit output lines an output in binary form which is the sum modulo 2 of the corresponding Gray code counter output together with all higher Gray code digits.

3. A counter according to claim 2 wherein additive input pulses beyond a maximum number and subtractive input pulses below zero are inhibited by said enabling means in response to said parity signal to thereby prevent overflow of said counter in either direction 4. A counter according to claim 1 permitting overflow of the counter further comprising: an additional multiple input enabling means having separate inputs connected to the input line and to the enabling means of the next preceding stage and having an output connected to an additional flip-flop stage, said additional flip-flop including an output line joined to said additional logic circuit whereby the output of said additional flip-flop serves as said direction control signal.

5. A counter according to claim 4 wherein said enabling means comprises an assembly of NAND gates.

6. A counter according to claim 4 wherein said enabling means comprises an assembly of NOR gates.

7. A plurality of counters of the type set forth in claim 1, one of said counters including: an additional multiple input enabling means having separate inputs connected to the input line and to the enabling means of the next preceding stage and having an output connected to an additional flip-flop stage, said additional flip-flop including an output line joined to the additional logic circuits of each of the counters whereby the output of said additional flip-flop serves as a direction control and synchronizing signal for the plurality of counters.